United States Patent
Tang et al.

(10) Patent No.: US 9,048,013 B2
(45) Date of Patent: Jun. 2, 2015

(54) PRESSURE SENSIBLE TEXTILE AND PRESSURE SENSIBLE DEVICE THEREOF

(75) Inventors: Chien-Fa Tang, Tu Chen (TW); Ching-Tang Huang, Tainan (TW)

(73) Assignee: TAIWAN TEXTILE RESEARCH INSTITUTE, Tu-Chen, Taipei Hsien (TW)

(*) Notice: Subject to any disclaimer, the term of this patent is extended or adjusted under 35 U.S.C. 154(b) by 2112 days.

(21) Appl. No.: 11/544,687

(22) Filed: Oct. 6, 2006

(65) Prior Publication Data

US 2007/0080773 A1   Apr. 12, 2007

(30) Foreign Application Priority Data

Oct. 11, 2005 (TW) .............................. 94135384 A

(51) Int. Cl.
*D03D 15/00* (2006.01)
*H01C 3/12* (2006.01)
*D03D 1/00* (2006.01)
*D03D 13/00* (2006.01)
*D03D 15/08* (2006.01)
*G06F 3/045* (2006.01)

(52) U.S. Cl.
CPC ................ *H01C 3/12* (2013.01); *D03D 1/0088* (2013.01); *D03D 13/004* (2013.01); *D03D 15/08* (2013.01); *D03D 2700/0137* (2013.01); *G06F 3/045* (2013.01)

(58) Field of Classification Search
CPC ........ G06F 3/045; H01C 3/12; D03D 1/0088; D03D 13/004; D03D 15/08; D03D 2700/0137
USPC ........... 442/181, 37, 192, 193, 195, 196, 197, 442/203, 217, 228, 229, 301, 364, 365, 372, 442/376

See application file for complete search history.

(56) References Cited

U.S. PATENT DOCUMENTS

| | | | |
|---|---|---|---|
| 4,795,998 A * | 1/1989 | Dunbar et al. | 338/5 |
| 6,333,736 B1 | 12/2001 | Sandbach | |
| 2002/0134116 A1 * | 9/2002 | Sandbach | 66/202 |
| 2003/0119391 A1 * | 6/2003 | Swallow et al. | 442/6 |

\* cited by examiner

*Primary Examiner* — Elizabeth Cole
(74) *Attorney, Agent, or Firm* — McClure, Qualey & Rodack, LLP

(57) ABSTRACT

A pressure sensible textile has at least a high-resistance conducting area and two groups of low-resistance conducting wefts or warps contacting the high-resistance area directly. The two groups of low-resistance conducting wefts or warps cross each other and do not contact with each other directly. Furthermore, two scanning circuits can be electrically connected to the two groups of low-resistance conducting wefts or warps. Then, a controller is added to the two scanning circuits to obtain a pressure sensible device.

17 Claims, 4 Drawing Sheets

US 9,048,013 B2

PRESSURE SENSIBLE TEXTILE AND PRESSURE SENSIBLE DEVICE THEREOF

RELATED APPLICATIONS

The present application is based on, and claims priority from, Taiwan Application Serial Number 94135384, filed Oct. 11, 2005, the disclosure of which is hereby incorporated by reference herein in its entirety.

BACKGROUND

1. Field of Invention

The present invention relates to a conducting textile and related detecting device. More particularly, the present invention relates to a pressure sensible textile and related pressure sensible device.

2. Description of Related Art

With the prosperity of technology, the conducting textile comprising the conducting wefts and warps and the common weaving fiber has been developed. Integrated with the electronic transmission sensor and switches, the conducting textile may be utilized to construct the electronic sensing units and to apply broadly to the sensing devices, for example, the pressure sensing devices.

Generally, it is usually required in the structure of the pressure sensible conducting textile in the prior art at least two layers of conducting wefts and warps interlaying to each other. The conducting pressure sensible textile disclosed in U.S. Pat. No. 6,333,736 is one of the examples. Without external pressure, the two layers of the conducting wefts and warps do not contact to each other and there is no current flowing between the two layers of the conducting wefts and warps, due to the insulating fibers between the two layers as a supporting structure. In the contrary, when there is pressure applied on the conducting textile, the two layers of the conducting wefts and warps contact to each other due to the external force, the current hence flow, and the pressure is sensed. However, limited by the circuit design, it is required a structure comprising at least two layers of the conducting wefts and warps for pressure sensing. Therefore, the conventional conducting textile is thicker, and the application of the relative products is limited accordingly.

SUMMARY

A pressure sensible textile is provided. The pressure sensible textile includes at least a high-resistance conducting area and two groups of low-resistance conducting wefts and warps that intercross each other without contacting to each other. The two groups of low-resistance conducting wefts and warps both contact the high-resistance conducting area.

According to an embodiment of the present invention, one of the two groups of low-resistance conducting wefts and warps is distributed over a side of the high-resistance conducting area, and another group of low-resistance conducting wefts and warps interweaves above and below the high-resistance conducting area alternately. Besides, a group of low-resistance conducting wefts and warps is grounded to separate the high-resistance conducting area into a coupled of pressure sensible areas to increase the sensitivity of detecting the location and magnitude of the pressure.

According to another embodiment, the pressure sensible textile can be composed of a plurality of high-resistance conducting areas. A group of low-resistance conducting wefts and warps is directly contacted with each of the plurality of high-resistance conducting areas separately, while another group of low-resistance conducting wefts and warps interweaves above and below the high-resistance conducting area. Besides, an insulating area can be utilized to totally isolate the high-resistance conducting areas in order to increase the sensitivity of detecting the location and magnitude of the pressure.

The aforementioned high-resistance conducting areas are composed of high-resistance conducting wefts and warps having a specific resistance of $10^2$-$10^6$ $\Omega$/cm. Some examples of the high-resistance conducting wefts and warps may comprise carbon fibers, stainless steel yarn, cupric ion fibers or other metal-plated fibers. The breaking elongation of the high-resistance conducting wefts and warps is to be greater than 30% for a better elasticity of the pressure sensible textile. A specific resistance of the low-resistance conducting wefts and warps, such as metal conducting lines or metal-plated fibers, is less than 50 $\Omega$/cm.

According to the embodiments above, the pressure sensible textile of the present invention can determine the location and the magnitude of the pressure source simply by laterally and longitudinally interweaving the low-resistance conducting wefts and warps over the one-layered high-resistance conducting textile, and accompanying by two scanning circuits. Therefore, the thickness and the weight of the pressure sensible textile can be substantially reduced, which improves and extends the application. Some of the examples are the pressure sensible rugs at the front door of stores, the interactive perceptive dolls, the children game carpet, the direction and speed detection carpets while people walk on them, and other various applications.

These and other features, aspects, and advantages of the present invention will become better understood with reference to the following description, figures, and appended claims.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
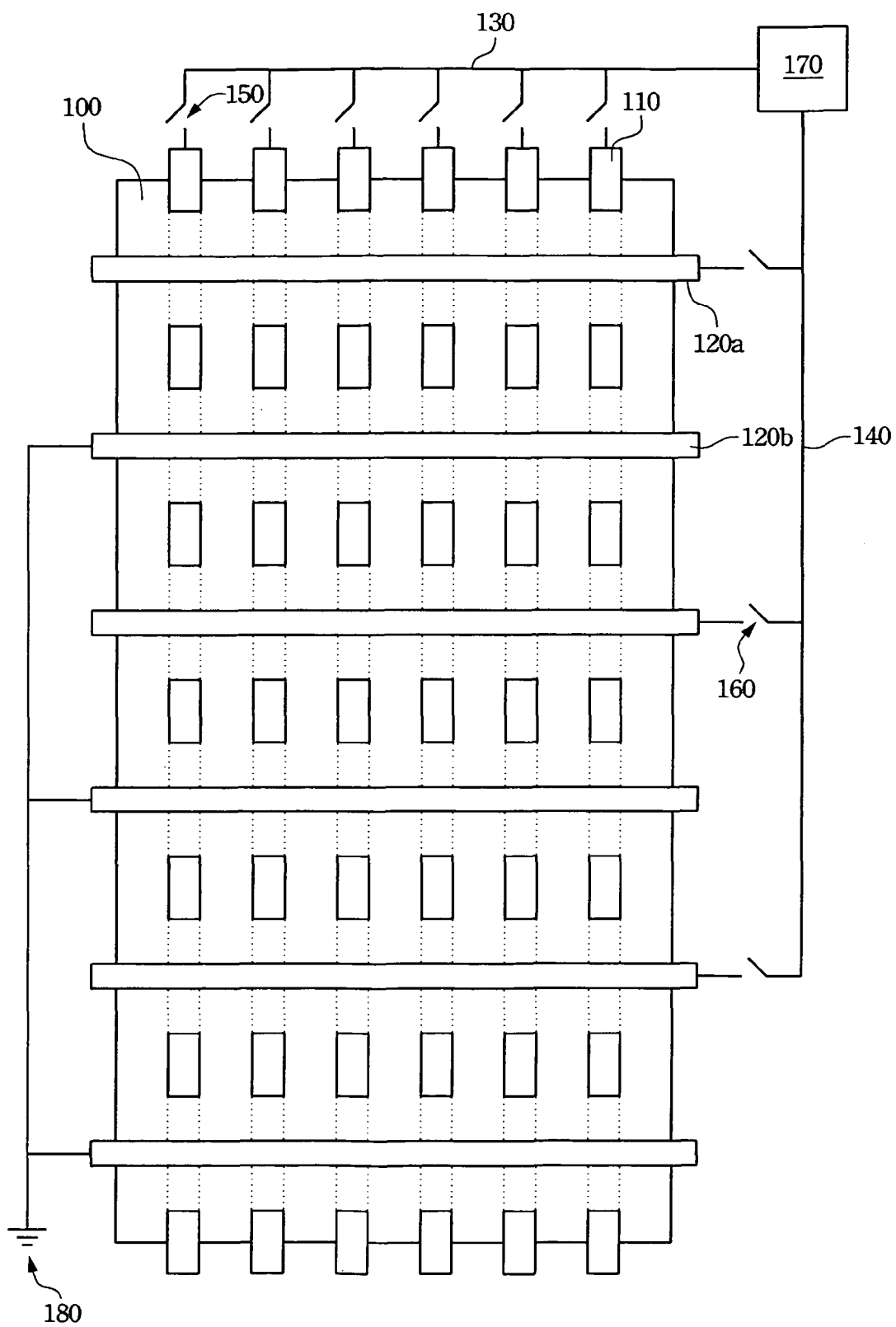
FIG. 1 is a diagram of a pressure sensible textile and the corresponding pressure sensible device according to an embodiment of the present invention is illustrated.

A pressure sensible textile and the pressure sensible device are herein introduced to solve the problems in the prior art.

Reference will now be made in detail to the present embodiments of the invention, examples of which are illustrated in the accompanying drawings. Wherever possible, the same reference numbers are used in the drawings and the description to refer to the same or like parts.

For the forgoing reasons, there is a need for a thin and light pressure sensible textile and the pressure sensible device adopting it such that the applicability and the convenience may be improved.

The First Embodiment

Referring to FIG. 1, a diagram of a pressure sensible textile and the corresponding pressure sensible device according to an embodiment of the present invention is illustrated.

In FIG. 1, the main textile 100 of the pressure sensible textile is composed of the high-resistance conducting wefts and warps. The low-resistance conducting warps 110 and the low-resistance conducting wefts 120*a* and 120*b* are crisscross distributed over the main textile 100. The low-resistance conducting warps 110 interweave above and below the main textile 100, and the low-resistance conducting wefts 120*a* and 120*b* are fixed only at one side of the main textile 100, for example, fixed at the upper side. The low-resistance conducting warps 110 and the low-resistance conducting wefts 120*a* and 120*b* are separated by the main textile 100 so that they do not contact to each other in order to prevent short circuits. The weaving scheme of the main textile 100 may be any conventional weaving scheme. For example, the main textile 100 may be a multi-layered structure made by weaving, or may be a warp-inserted multi-layered structure made by knitting.

The specific resistance of the aforementioned low-resistance conducting warps 110 and the low-resistance conducting wefts 120*a* and 120*b* is to be less than 50 $\Omega$/cm for better current conducting. The low-resistance conducting warps 110 and the low-resistance conducting wefts 120*a* and 120*b* may adopt common metal conducting lines, and preferably, softer metal-plated fibers, such as silver-plated fibers.

Figure 2:
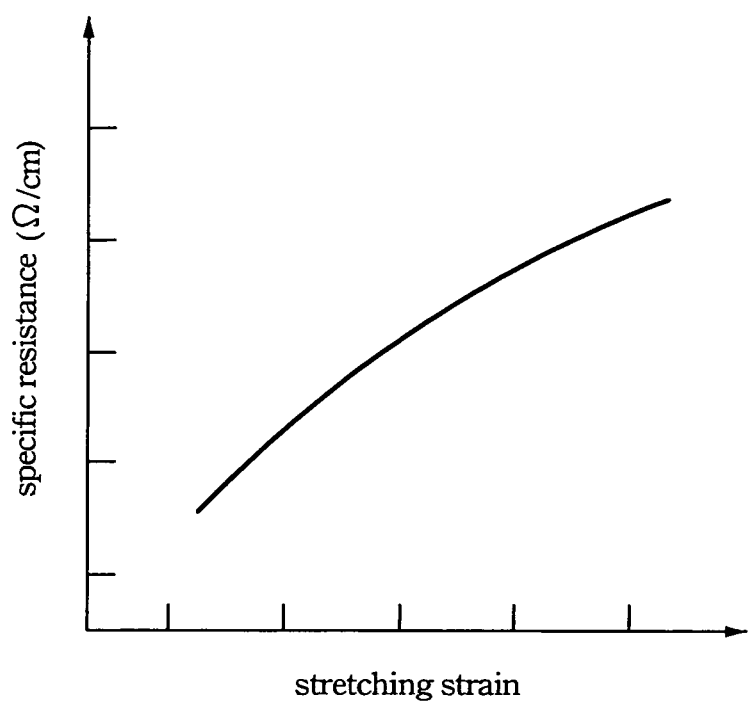
FIG. 2 is a diagram illustrating the relationship between the specific resistance and the magnitude of the deformation of the high-resistance conducting warps and wefts.

The specific resistance of the aforementioned high-resistance conducting wefts and warps of the main textile 100 is preferably $10^2$-$10^6$ $\Omega$/cm. Moreover, the aforementioned high-resistance conducting wefts and warps need to be elastic. For example, the breaking elongation is to be greater than 30%. Therefore, the high-resistance conducting wefts and warps can not only maintain the conductivity, but also provide a delicate variation of resistance along with the deformation of the fibers. Hence the sensitivity of the pressure detection is increased. Please refer to FIG. 2 that displays the relation between the specific resistance and the stretching strain for example. When the amount of the stretching strain increases, the specific resistance of the conducting wefts and warps enlarges.

Some examples of the high-resistance conducting wefts and warps of the present invention are the conducting wefts and warps plated with a conducting layer, such like carbon fibers or cupric ion fibers, and stainless steel blended yarn or silver-plated fiber. Besides, the conducting wefts and warps of the present invention may further be conjugate spun with common weaving fibers with the present conducting wefts and warps located outside the common weaving fibers. For instance, the conducting wefts and warps of the present invention may wrap around the common weaving fibers to form conjugate fibers with a structure of wrapped yarn, while applying beaming in the weaving procedure.

In FIG. 1, the low-resistance conducting warps 110 and the low-resistance conducting wefts 120*a* are coupled to the vertical scanning circuit 130 and the lateral scanning circuit 140 through the switch 150 and the switch 160 respectively, while the vertical scanning circuit 130 and the lateral scanning circuit 140 are further coupled to the controller 170 respectively. In the pressure sensing duration, the controller 170 outputs control signals to the vertical scanning circuit 130 and the lateral scanning circuit 140 separately in order to repeatedly and alternately control the statuses of the switch 150 of the vertical scanning circuit 130 and the switch 160 of the lateral scanning circuit 140, such that only one of the two switches 150 and 160 is at the "on" status for the benefit to detecting the location of the pressure source.

According to the pressure sensible textile provided by the embodiment of the present invention, the principle of the pressure sensation when there are only the low-resistance conducting warps 110 and the low-resistance conducting wefts 120*a*, and the vertical scanning circuit 130 and the lateral scanning circuit 140 coupled to the low-resistance conducting warps 110 and the low-resistance conducting wefts 120*a*, is briefly described below.

When there is a pressure source applied on the pressure sensible textile, the main textile 100 will be deformed. Since the main textile 100 is made by the elastic high-resistance conducting wefts and warps, the electric signals of the variation of the specific resistance resulted from the deformation may be transmitted to the nearest low-resistance conducting warp 110 and the nearest low-resistance conducting weft 120*a* through the high-resistance conducting wefts and warps. Further, the controller 170 turns on the vertical scanning circuit 130 and the lateral scanning circuit 140 coupled to the aforementioned low-resistance conducting warp 110 and the low-resistance conducting weft 120*a* alternately. Hence only the vertical scanning circuit 130 and the lateral scanning circuit 140 which are turned on can transmit the electric signals representing the specific resistance of the main textile 100 to the controller 170.

Generally speaking, the electric signals represented the variation of the specific resistance of the main textile 100 of the low-resistance conducting warps 110 and the low-resistance conducting wefts 120*a* is bigger while the location is nearer to the pressure source or the magnitude of the pressure source is bigger. Therefore, when the controller 170 receives the electric signals representing the variation of the specific resistance from different low-resistance conducting warps 110 and the low-resistance conducting wefts and warps 120*a* in order, the controller 170 is able to detect the location and the magnitude of the pressure source with operation by an internal or external data processing center.

However, when the area of the main textile 100 is too big, the electric signals represented the pressure may become weak due to the high resistance of the transmission path resulted in the long transmission distance. Therefore, the low-resistance conducting wefts 120*b* coupled to the ground line 180 may be utilized to separate the main textile 100 into several areas, such that the electric signals from the pressure source between the two neighboring low-resistance conducting wefts 120*b* can only be transmitted out from the low-resistance conducting warps 120*a* between them. Any electric signals will vanish when being coupled to the grounded low-resistance conducting wefts 120*b*. Hence, no matter where the pressure source is located on the main textile 100, the transmission range of the resulted electric signals does not exceed the area bounded by two neighboring low-resistance conducting wefts 120*b*.

The Second Embodiment

Figure 3:
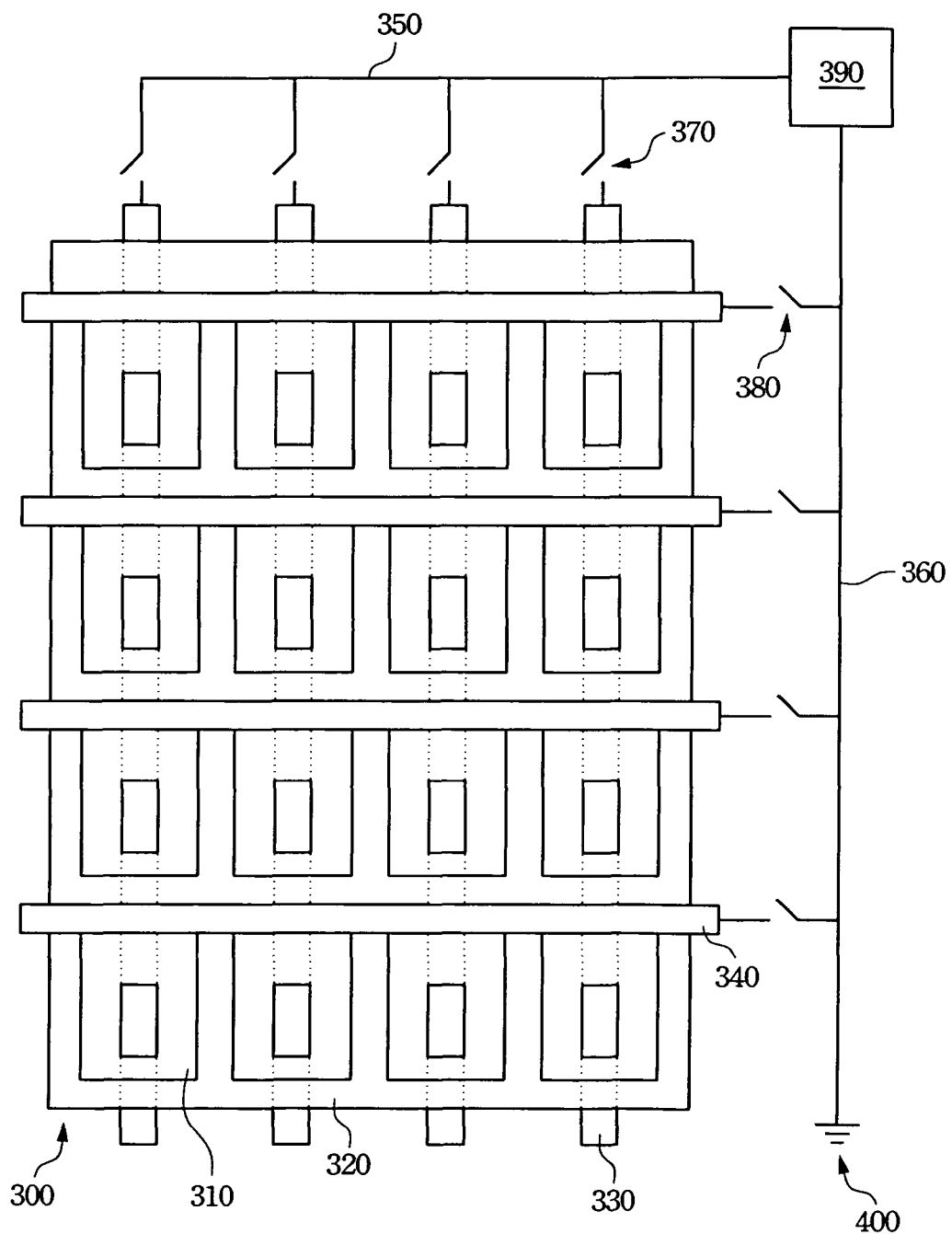
FIG. 3 is a diagram of the pressure sensible textile and the corresponding pressure sensible device according to another embodiment of the present invention.

Please refer to FIG. 3. FIG. 3 illustrates a diagram of the pressure sensible textile and the corresponding pressure sensible device according to another embodiment of the present invention.

In FIG. 3, the structure of the pressure sensible textile is different from the pressure sensible textile displayed in FIG. 1. In FIG. 3, the main textile 300 of the pressure sensible textile is composed of the pressure sensible area 310 formed by the high-resistance conducting wefts and warps and the insulating area 320 formed by the common yarn. The low-resistance conducting warps 330 are mainly located below the main textile 300 with a short section located above the pressure sensible area 310 in order to directly contact to the high-resistance conducting wefts and warps of the pressure sensible area 310. The low-resistance conducting wefts 340 are mainly located above the main textile 300 and directly contact to a side of the pressure sensible area 310. The materials of the aforementioned high-resistance conducting wefts and warps forming the pressure sensible area 310, and the materials of the low-resistance conducting warps 330 and the low-resistance conducting wefts 340, are similar to those described in the first embodiment described above.

Figure 4:
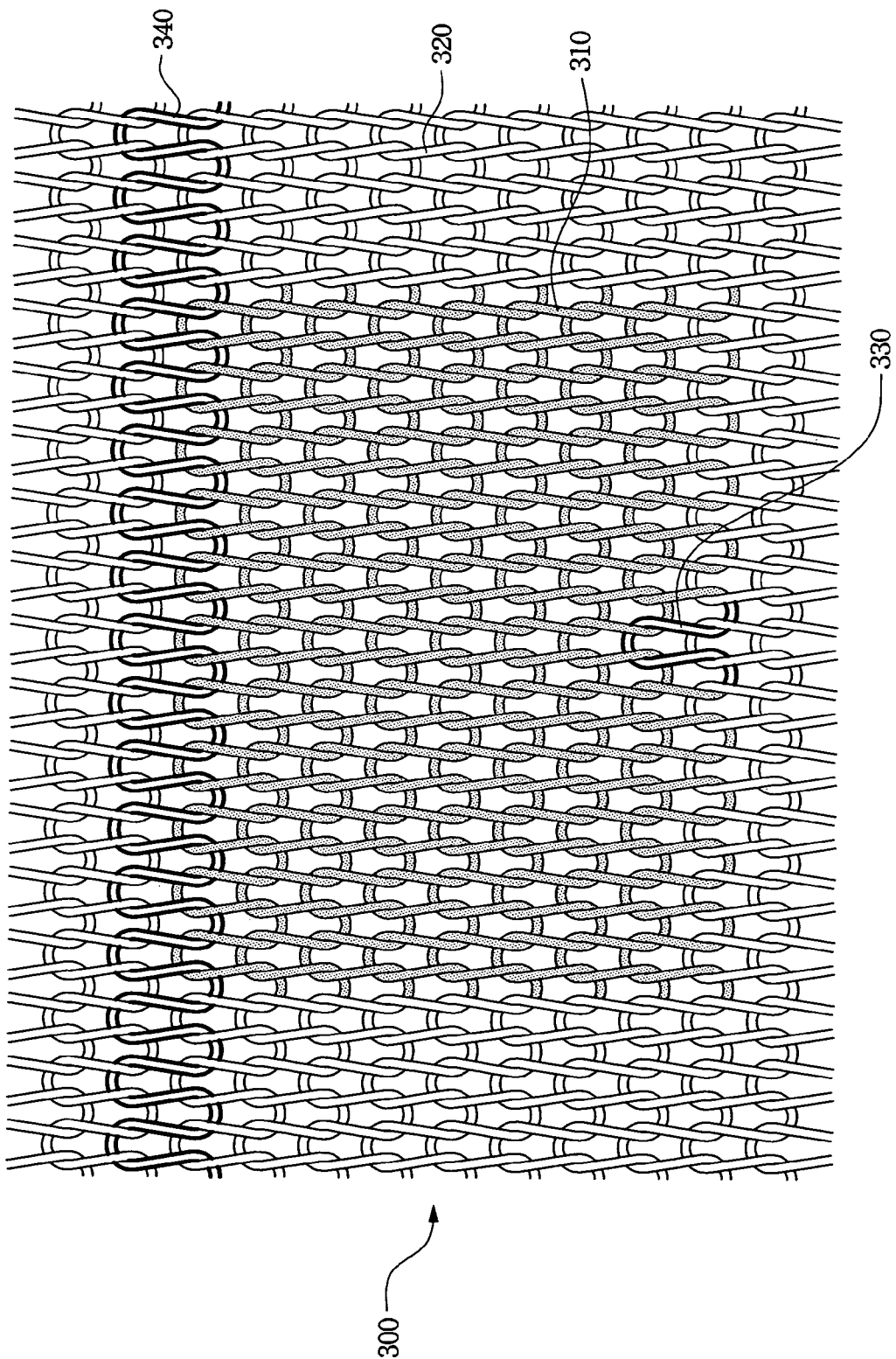
FIG. 4 is a vertical view of one of the pressure sensible areas 310 in FIG. 3 and an insulating area 320 nearby.

The main textile 300 mentioned above may be a multi-layered structure made by weaving, or may be a warp-inserted multi-layered structure made by knitting. Please refer to FIG. 4. FIG. 4 illustrates a vertical view of one of the pressure sensible areas 310 in FIG. 3 and an insulating area 320 nearby. The main textile 300 is formed by weaving. As displayed in FIG. 4, assuming the main textile 300 is made by weaving, the low-resistance conducting warps 330 and the low-resistance conducting wefts 340 can even be integrated into the main textile 300 as a part of the main textile 300.

Please refer to FIG. 3 again. The low-resistance conducting warps 330 and the low-resistance conducting wefts 340 are coupled to the vertical scanning circuit 350 and the lateral scanning circuit 360 respectively through the switch 370 and the switch 380 respectively, and the vertical scanning circuit 350 and the lateral scanning circuit 360 are further coupled to the controller 390. The control method of the vertical scanning circuit 350 and the lateral scanning circuit 360 is similar to the control method of the vertical scanning circuit 130 and the lateral scanning circuit 140 of the pressure sensible textile shown in FIG. 1. That is, the controller 390 fast and alternately controls the statuses of the switches 370 and 380, such that there is only one vertical scanning circuit 350 and one lateral scanning circuit 360 are electric conductive. The lateral scanning circuit 360 is further coupled to the ground line 400 to provide a low potential reference voltage of the fast scanning circuit.

Similar to the principle of the pressure sensible textile in FIG. 1, when there is an external pressure applied to the pressure sensible textile, the main textile 300 is deformed accordingly and so as the pressure sensible area 310. However, in FIG. 3, the pressure sensible areas 310 of the pressure sensible textile are separated by the insulating areas 320. Hence the electric signals representing the change of the specific resistance caused by the deformation of the pressure sensible area 310 can only be transmitted to the low-resistance conducting warps 330 and the low-resistance conducting wefts 340 coupled to the pressure sensible area 310 that carries the pressure. Further, the low-resistance conducting warps 330 and the low-resistance conducting wefts 340 are coupled to the vertical scanning circuit 350 and the lateral scanning circuit 360. Therefore, only when the vertical scanning circuit 350 and the lateral scanning circuit 360 coupled to the aforementioned low-resistance conducting warps 330 and the low-resistance conducting wefts 340 are electric conductive, the electric signals represented the variation of the specific resistance can be transmitted to the controller 390.

Therefore, when the controller 390 receives the electric signals represented different specific resistances from the low-resistance conducting warps 330 and the low-resistance conducting wefts 340 coupled to the pressure sensible area 310 that carries pressure, the location and the magnitude of the pressure source can be determined precisely through a data processing center inside or outside the controller 390.

According to the embodiments above, the pressure sensible textile of the present invention can determine the location and the magnitude of the pressure source simply by interweaving the lateral and low-resistance conducting wefts and warps over the high-resistance conducting textile, and accompanying by two scanning circuits. Therefore, the thickness and the weight of the pressure sensible textile can be substantially reduced, which improves and extends the application. Some of the examples are the pressure sensible rugs at the front door of stores, the interactive perceptive dolls, the children game carpets, the direction and speed detection carpets, and other various applications.

Although the present invention has been described in considerable detail with reference to certain embodiments thereof, other embodiments are possible. Therefore, their spirit and scope of the appended claims should no be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pressure sensible device comprising:
a main textile, comprising at least a high-resistance conducting area, wherein the high-resistance conducting area comprises a plurality of elastic high-resistance conducting wefts and warps, and a specific resistance of the plurality of high-resistance conducting wefts and warps is $10^2$-$10^6$ $\Omega$/cm, and wherein a breaking elongation of the elastic high-resistance conducting wefts and warps is greater than 30% so that resistance of the elastic high-resistance conducting wefts and warps varies as a deformation of the high-resistance conducting wefts and warps occurs, and the deformation is caused by a pressure source applied on the main textile;
a plurality of first low-resistance conducting wefts distributed only over a first surface of the high-resistance conducting area and not interweaved with the main textile, wherein a specific resistance of the plurality of first low-resistance conducting wefts is less than 50 $\Omega$/cm to conduct an electrical signal generated by the deformation of the elastic high-resistance conducting wefts and warps;
a plurality of low-resistance conducting warps distributed and interweaved over the first surface and a second surface of the high-resistance conducting area, wherein the first low-resistance conducting wefts and the low-resistance conducting warps are separated by the main textile so that the low-resistance conducting warps do not directly contact the first low-resistance conducting wefts, and a specific resistance of the low-resistance conducting warps is less than 50 $\Omega$/cm to conduct the electrical signal generated by the deformation of the elastic high-resistance conducting wefts and warps;
a lateral scanning circuit comprising a plurality of first switches electrically connected to the lateral scanning circuit separately;
a vertical scanning circuit comprising a plurality of second switches electrically connected to the vertical scanning circuit separately; and
a controller connected to the lateral scanning circuit and the vertical scanning circuit, and being capable of turning on the plurality of first switches and the plurality of second switches alternately and repeatedly to receive the electrical signal such that a location and a magnitude of the pressure source can be determined by a data processing center.

2. The pressure sensible device of claim 1, wherein the plurality of high-resistance conducting wefts and warps may comprise carbon fibers, stainless steel yarn, cupric ion fibers or silver-plated fibers.

3. The pressure sensible device of claim 1, wherein the plurality of first low-resistance conducting wefts and the plurality of low-resistance conducting warps are metal conducting lines or metal-plated fibers.

4. The pressure sensible device of claim 3, wherein the metal-plated fibers comprise silver-plated fibers.

5. The pressure sensible device of claim 1, further comprising a plurality of second low-resistance conducting wefts coupled to ground and distributed only over the first surface of the main textile in order to separate the main textile into a couple of sensible areas, wherein the plurality of second low-resistance conducting wefts do not directly contact the plurality of low-resistance conducting warps, and a specific resistance of the plurality of first low-resistance conducting wefts is less than 50 Ω/cm.

6. The pressure sensible device of claim 5, wherein the plurality of second low-resistance conducting wefts are metal conducting lines or metal-plated fibers.

7. The pressure sensible device of claim 6, wherein the plurality of second low-resistance conducting wefts are metal-plated fibers.

8. The pressure sensible device of claim 7, wherein the metal-plated fibers comprise silver-plated fibers.

9. A pressure sensible device comprising:
a main textile, comprising a plurality of high-resistance conducting areas, wherein the high-resistance conducting areas are composed of a plurality of elastic high-resistance conducting wefts and warps having a specific resistance $10^2$-$10^6$ Ω/cm, and wherein a breaking elongation of the elastic high-resistance conducting wefts and warps is greater than 30% so that resistance of the elastic high-resistance conducting wefts and warps varies as a deformation of the high-resistance conducting wefts and warps occurs, and the deformation is caused by a pressure source applied on the main textile;
a plurality of low-resistance conducting wefts directly contacting the plurality of high-resistance conducting areas and not interweaved with the main textile, wherein a specific resistance of the plurality of low-resistance conducting wefts is less than 50 Ω/cm to conduct an electrical signal generated by the deformation of the elastic high-resistance conducting wefts and warps;
a plurality of low-resistance conducting warps interweaved above and below the high-resistance conducting areas, wherein the low-resistance conducting wefts and the low-resistance conducting warps are separated by the main textile so that the low-resistance conducting warps do not directly contact the first low-resistance conducting wefts, and a specific resistance of the plurality of low-resistance conducting warps is less than 50 Ω/cm to conduct the electrical signal generated by the deformation of the elastic high-resistance conducting wefts and warps;
a lateral scanning circuit comprising a plurality of first switches electrically connected to the lateral scanning circuit separately;
a vertical scanning circuit comprising a plurality of second switches electrically connected to the vertical scanning circuit separately; and
a controller, connected to the lateral scanning circuit and the vertical scanning circuit, and being capable of turning on the plurality of first switches and the plurality of second switches alternately and repeatedly to receive the electrical signal such that a location and a magnitude of the pressure source can be determined by a data processing center.

10. The pressure sensible device of claim 9, wherein the plurality of high-resistance conducting wefts and warps may comprise carbon fibers, stainless steel yarn, cupric ion fibers or silver-plated fibers.

11. The pressure sensible device of claim 9, wherein the plurality of low-resistance conducting wefts and the plurality of low-resistance conducting warps are metal conducting lines or metal-plated fibers.

12. The pressure sensible device of claim 11, wherein the metal-plated fibers comprise silver-plated fibers.

13. The pressure sensible device of claim 9 further comprising an insulating area in order to isolate the high-resistance conducting areas.

14. A pressure sensible textile comprising:
a main textile having at least a high-resistance conducting area, comprising a plurality of elastic high-resistance conducting wefts and warps having a specific resistance $10^2$-$10^6$ Ω/cm, and wherein a breaking elongation of the elastic high-resistance conducting wefts and warps is greater than 30% so that resistance of the elastic high-resistance conducting wefts and warps varies as a deformation of the high-resistance conducting wefts and warps occurs, and the deformation is caused by a pressure source applied on the main textile;
a plurality of first low-resistance conducting yarns, distributed over and directly contacting the high-resistance conducting area, wherein a specific resistance of the plurality of first low-resistance conducting yarns is less than 50 Ω/cm to conduct an electrical signal generated by the deformation of the elastic high-resistance conducting wefts and warps; and
a plurality of second low-resistance conducting yarns, distributed over and directly contacting the high-resistance conducting area, wherein a specific resistance of the plurality of second low-resistance conducting yarns is less than 50 Ω/cm to conduct the electrical signal generated by the deformation of the elastic high-resistance conducting wefts and warps, and the first low-resistance conducting yarns and the second low-resistance conducting yarns are not parallel to each other and separate by the main textile so that the first low-resistance conducting yarns and the second low-resistance conducting yarns do not contact to each other.

15. The pressure sensible textile of claim 14, wherein the plurality of high-resistance conducting wefts and warps may comprise carbon fibers, stainless steel yarn, cupric ion fibers or silver-plated fibers.

16. The pressure sensible textile of claim 14, wherein the plurality of first low-resistance conducting wefts and warps and the plurality of second low-resistance conducting wefts and warps are metal conducting lines or metal-plated fibers.

17. The pressure sensible textile of claim 16, wherein the metal-plated fibers comprise silver-plated fibers.

* * * * *